UNITED STATES PATENT OFFICE.

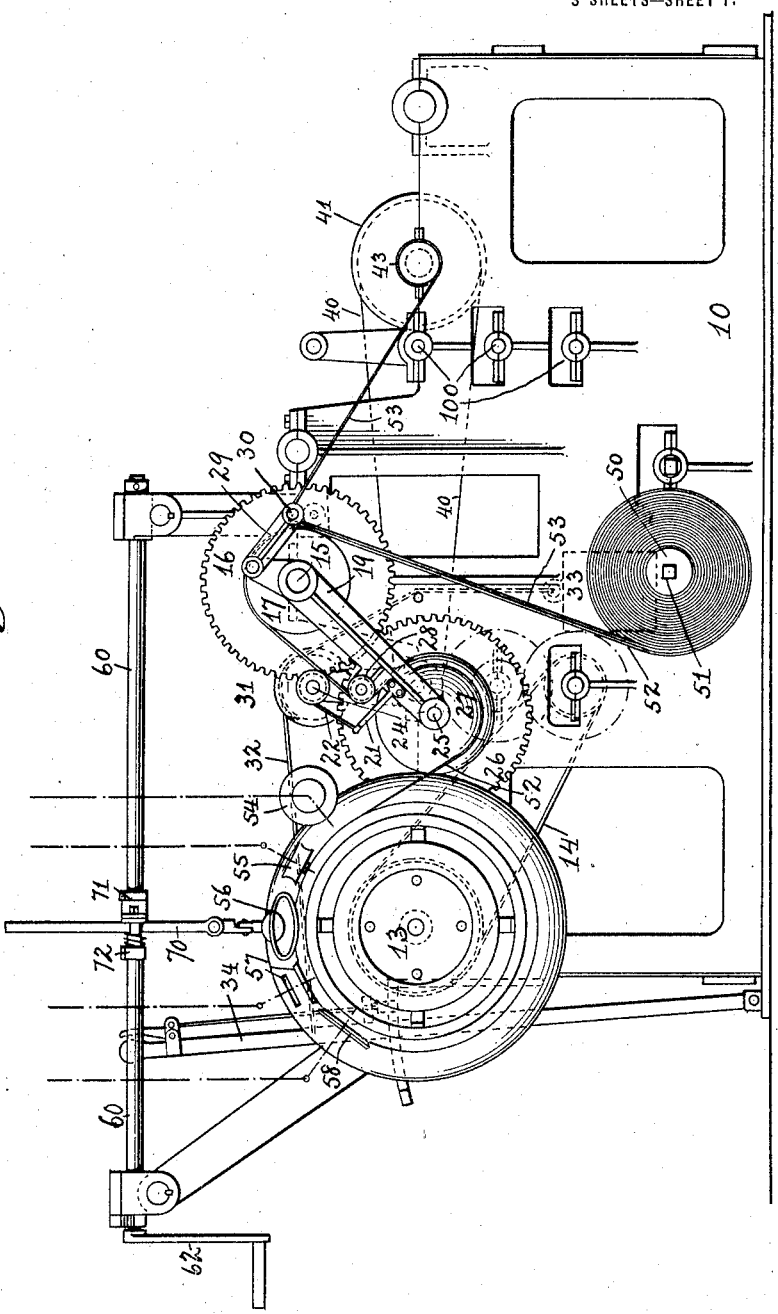

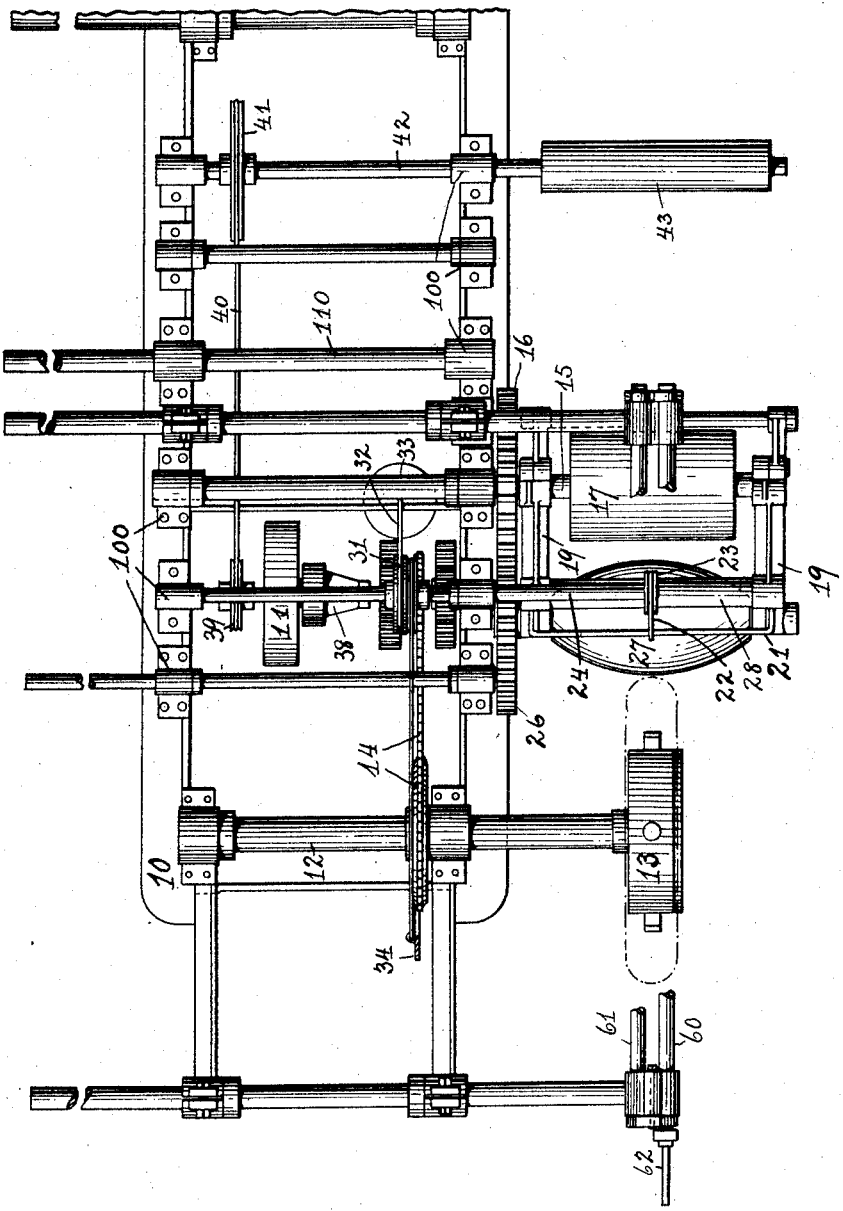

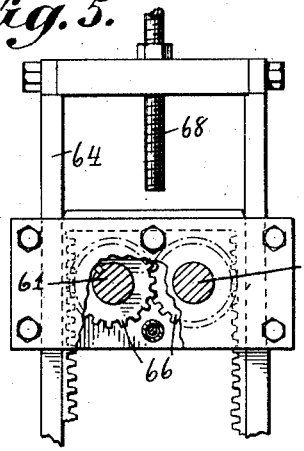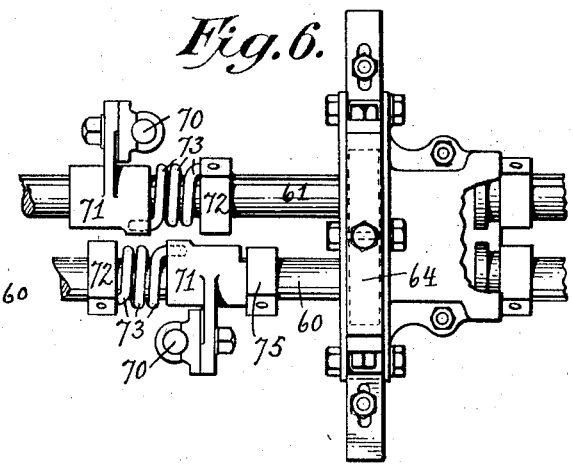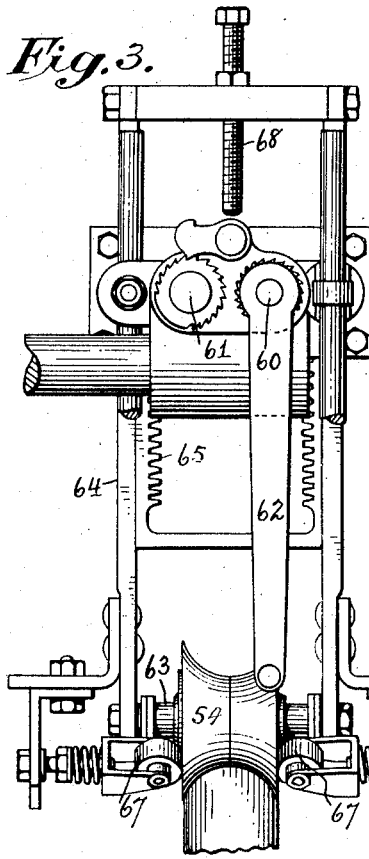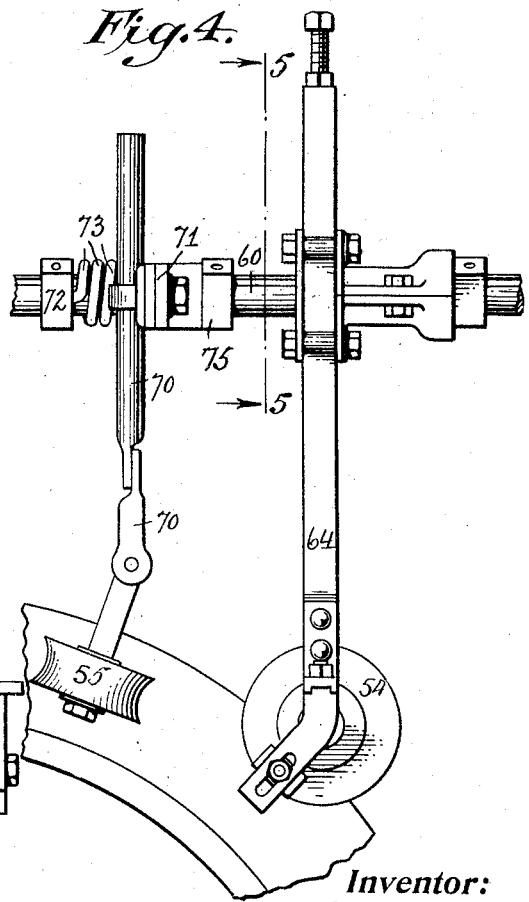

LOUIS P. ARNOLD, OF NORWALK, CONNECTICUT.

TIRE-MAKING MACHINE.

1,302,122.　　　　Specification of Letters Patent.　　Patented Apr. 29, 1919.

Application filed March 7, 1916.　Serial No. 82,522.

*To all whom it may concern:*

Be it known that I, LOUIS P. ARNOLD, a citizen of the United States, residing at Norwalk, in the county of Fairfield and State of Connecticut, have invented certain new and useful Improvements in Tire-Making Machines, of which the following is a specification.

This invention relates to an automobile tire forming machine, and its novelty consists in the construction and adaptation of the parts, as will be more fully pointed out hereinafter.

In the art of making tires of the kind described, with the use of mechanical aids for placing the fabric upon the core, difficulties have been encountered, the chief one being that the tension upon the fabric in the finished tire is not uniform and when strains come on the tire, some of the parts give way before others and the tire is worn out before the strength of all of its parts has been utilized. It is the purpose of this invention to provide means for placing upon the tire fabric in the course of its construction a substantially uniform tension independent of the size of the core and of the finished tire, and means for proportioning such tension to the varying curvatures of the parts.

In general it should be said that each size of tire requires a stated length of the fabric which is composed of canvas or the like impregnated with rubber so that it is sticky or tacky. This fabric is usually cut on the bias and strips of the required length and width are usually wound on a stock roll, the free ends of the various strips being overlapped in the manner well known in the art. A cotton liner of continuous length is interposed between each succeeding layer of tire fabric on the stock roll to prevent the latter from sticking together. The tire fabric is then wound in successive layers around a ring core of the general shape of a horse shoe in cross section. The first ply of fabric where it is wound on the ring core is usually narrower than the succeeding plies which increase in width either continuously or intermittently as they are built one upon another to form what is generally known as the tire carcass.

In the practice of the present invention, the prepared fabric is led from the stock roll to a retarding drum passing over a considerable portion of the surface of the same. Thence it passes over a spreading roll to a stretching or forming drum or roll and thence to the ring core in contact with the latter. In order to prevent slippage, or loss of stretch, in the fabric, the surface of both the retarding drum and stretching drum is prepared or covered in any suitable manner and the tire fabric in passing over these two drums is preferably made to come into contact with a considerable part of the surface of both drums. A predetermined stretch is given to the fabric by a difference in the peripheral speed of these two drums which may be attained by a properly proportioned pair or by a series of gears or by any other well known mechanical means. As the tire fabric is wound around the ring core, it can be subjected to the action of various so-called "stitching" tools whereby it is pressed against the core to take the wrinkles, if any, out of it, and to cause the successive layers to adhere to each other and thus form a solid annular structure.

There is illustrated in the drawing, a preferred form of machine embodying the invention. In practice, the operative parts are mounted in duplicate upon a single main frame whereby two tires may be simultaneously formed, one on each side of the device, but as the parts on each side constitute a unitary device, and as they are both alike, only one will be described.

In the drawings, Figure 1 is a side elevation of the device, and Fig. 2 a top plan view. Fig. 3 is an enlarged side elevation of the tread pressing stitching tool and its connected parts; Fig. 4 is a side elevation of the same and of one of the adjacent stitching tools; Fig. 5 is a vertical section on the plane of the line 5—5 in Fig. 4; and Fig. 6 is a top plan view of the parts shown in Fig. 4.

In the drawing, 10 designates generally a main frame upon which the various parts are mounted. It is provided with a number of bearings 100 in which are mounted to revolve the various transverse shafts hereinafter mentioned. A driving pulley 11 is driven from any suitable source of power, as a belt (not shown). The shaft itself cannot be seen as in all the views it is concealed by other parts, but the similar shaft in use in the duplicate mechanism on the other side of the machine is seen at 110. A shaft 12 carries at one end a ring core 13 on which the tire is to be formed, and this shaft is driven from the pulley 11 by any suitable power transmitting mechanism generally designated 14.

A shaft 15 arranged transversely across the main frame carries a gear 16, and a cylindrical retarding drum 17. It also carries a swinging subframe comprising two side members 19, 19. A bail 21 is secured to these members and to the bail in turn is secured a cable 22 wound on a sheave 23 mounted on the end of a shaft 24 supported in bearings in the main frame. A shaft 25 is carried by the side members 19 at the lower end of the subframe, and secured to it and revolving with it is a gear 26 and a stretching drum 27. This drum is of peculiar ellipsoidal shape of greatest diameter at its center, where it is in line with the center of the core 13, and tapering, or of progressively decreasing diameter, toward its ends. Also mounted across the subframe is a spreading roll 28, with the usual right and left spiral grooves and also, at the upper end of the frame and mounted between two pivoted brackets 29, is a liner guide or diverting roll indicated at 30.

The shaft 24 also carries a double grooved sheave 31 around which is wound a cable 32 to one end of which is secured a weight 33 and to the other end of which is secured an operating lever indicated at 34.

Mounted on the same shaft as the pulley 11 is a clutch, or power transmission mechanism, of any suitable construction, generally indicated at 38, and also a sheave 39 around which is arranged a belt 40 passing around a pulley 41 on a shaft 42 carrying a cylindrical liner roll holder 43.

A stock roll 50 is mounted on an idler shaft 51 at the bottom of the machine as above explained. The lengths of the fabric 52 are narrower at their front end which reach the core first and gradually widen toward their opposite end where a new length of fabric overlaps and adheres to the one in front of it, but it has not been attempted to illustrate this feature on account of the small size of the parts as compared with the other parts. Each length of fabric has a liner 53 of substantially non-elastic protective material, as cotton cloth.

Adjacent to the ring core are the stitching tools, which are adapted to press the fabric of the tire down upon the core so as to smooth it and cause each layer thoroughly to adhere to the layer beneath it. The first of these tools, enumerating them in order along the line of travel of the fabric, is a tread pressing concave roller indicated at 54; then comes a pair of double concave rollers 55 adapted to press the sides of the tire near the tread; then a pair of disks 56 to press a part of the tire farther from the tread; then a pair of rollers 57 to press the fabric near the bead, and at the same time hold down the sides of the tire; and finally a pair of rollers 58 adapted to press the bead itself.

These tools are all mounted on and operated from a pair of shafts 60, 61 mounted in suitable bearings in the frame 10 and which are provided with intermeshing pinions in pairs at suitable places and are moved by a crank 62 secured to the shaft 60.

Referring to the tool 54, it is mounted on a short shaft 63 in a frame 64 carrying a duplex rack 65 moved by the pinions 66, 66 carried by the shafts 60 and 61. Spring pressed rollers 67, 67 prevent any lateral displacement of the tool. When the crank 62 is moved, the frame 64 and its tool descend and the latter rests upon and presses against the fabric on the ring core. When it is desired to lift up the tool, the crank is reversed and the duplex rack 65 drawn upward to the limit of its movement determined by the position of an adjustable stop 68 carried by the frame 64. The frame 64 carrying roll 54 is then lifted away from the ring core.

All the other tools are in pairs and actuated exactly alike, so only the pair 55 will be described. They are each mounted on a jointed shaft 70 arranged in a holder 71 secured on the shaft 60 or 61 as the case may be. There is a collar 72 also mounted on the shaft 60 or 61 and between this and the holder is a torsion spring 73. By the rotation of the crank 62 the spring is wound up or unwound as the case may be, to cause the tools to move within a limit set by the collar 75 fixed on the shaft with which the holder 71 engages. After this point is reached the further rotation of the crank 62 causes the tools to move to or from the ring core as the case may be.

Before the stretching drum is allowed to swing against the ring core, the fabric roll holder is put in place and the tire fabric 52 with its liner 53 is pulled upward until it is beyond the roll 30. The tire fabric and the liner are then separated, the liner 53 being pulled backward to the liner roll holder 43 to which it is secured, and the fabric strip 52 being passed over and partly around the retarding drum 17, down to and over the spreading roll 28, under and partly around the stretching drum 27.

Assuming that the machine is at rest, the lever 34 is released from its detent or holding device, thereby allowing the weight 33 to drop downward. This winds the cable 22 on its sheave 23 and the subframe on which is mounted the stretching drum is thus drawn up until the stretching drum comes in contact with the ring core. The free end of the prepared tire fabric 52, which has already been passed around the stretching drum 27, is then caused to adhere to the ring core previously prepared in the manner well known in the art. The crank 62 is then moved and the stitching tools brought to position on the ring core; the clutch 38 is then thrown in and the operating mechanism started. This causes the ring core 13 and the liner roll holder 43 to be revolved. The contact between the surfaces of the ring core, the fabric and the stretching drum 27, causes the latter to revolve and with it the gears 26 and 16, and the retarding drum 17. The spreading roll 28 is also caused to revolve. The fabric strip 52 is attached to the ring core 13 and is thus pulled forward from the stock roll 51, passing over the retarding drum 17, the spreading roll 28, under the stretching drum 27, and then to the ring core on which it is wound, being pressed against the core by the stitching tools.

The gears 26 and 16 are so proportioned, as previously pointed out, that the peripheral speed of the stretching drum 27 at its point of greatest diameter, is a little greater than that of the retarding drum 17 so that the fabric is, in its passage between these two drums, not only spread by the roll 28 in the usual manner, but it is stretched to an extent which is predetermined by the relative peripheral speeds of the drums. Not only that, but because of the greater central diameter of this stretching drum and its barrel shaped form, the fabric is stretched more at its medial line than at its edges and to a decreasing variable extent between, so that as it is delivered to the ring core, it is under such variable tension at different parts of its width, and while under such tension is stitched upon the core, producing a tire in which the layers are under a substantially uniform tension throughout, an object long sought to be obtained.

When the winding operation is completed, which will be apparent to the operator by the appearance at the ring core of the narrower first ply of the succeeding tire strip, the operating lever is moved, the subframe carrying the stretching drum is drawn away, the finished tire is removed, another ring core placed in position, the subframe is allowed to swing back into place, and a new winding operation started.

I claim:

1. A machine of the class described, comprising a rotary core, a stretching drum, means for delivering a strip of tire fabric already under a greater stretching tension at its center than at its edges to the rotary core, and means for promoting a driving contact between the rotary core and the stretching drum consisting of a swinging frame carrying the drum and a weight by which it is constantly drawn in contact with the core.

2. A tire making machine comprising a rotary core, a stretching drum and a retarding drum, the stretching drum having its greatest diameter at the center and progressively decreasing in diameter therefrom toward its edges; means for promoting contact between the core and the stretching drum, consisting of a fixed shaft on which the core is mounted and a relatively movable shaft on which the stretching drum is mounted and a device for constantly drawing the drum toward the core; means for revolving the retarding drum and the stretching drum at relatively different speeds so as to produce a greater tension at the center than at the edges on a strip of tire fabric passing between them to the revoluble core, a stock roll, a liner-diverting roll arranged between the stock roll and the retarding drum, and a liner roll holder adapted to take up the liner so diverted.

3. In a machine of the character described, an oscillatory frame, a retarding roll arranged at the axis of its oscillation, and a stretching roll arranged at its movable end, in combination with a spreading roll between the retarding roll and the stretching roll, a liner diverting roll adjacent to the retarding roll, and means for moving the frame and holding it in its new position, consisting of a cable indirectly secured to the frame, a pulley over which it runs, and a weight suspended at the end of the cable, and means for holding the weight inactive to allow the frame to drop, consisting of an operating lever secured to the cable.

4. In a machine of the character described, including a ring core, a tire tread pressing stitching tool, consisting of a roller adapted to engage the tread forming portion of the core, and means for moving the roller to and from the core, consisting of two shafts, a frame adapted to engage both, and means for moving the frame with respect to both shafts.

5. In a machine of the character described, including a ring core, a tire tread pressing stitching tool, consisting of a roller adapted to engage the tread forming portion of the core, means for moving the roller to and from the core, consisting of two shafts, a frame adapted to engage both, and means for moving the frame with respect to both shafts, consisting of racks on the frame and pinions on the shafts meshing therewith.

6. A tire forming machine, comprising a retarding drum, a stretching drum having an ellipsoidal surface, a revoluble core, means for revolving the said drums at relatively different speeds so as to produce a greater tension at the center than at the edges of a strip of tire fabric passing between them and means for moving and yieldably holding the stretching drum into and out of frictional contact with the revoluble core.

7. A tire forming machine comprising a revoluble core, a retarding drum, a stretching drum having a greater diameter at its center than at its edges, means for revolving the said drums at relatively different speeds to produce a greater tension at the center than at the edges upon a strip of tire fabric passed between them consisting of gears secured to and moving with both drums, and means for moving and yieldably holding the stretching drum into and out of frictional contact with the revoluble core.

In testimony whereof I affix my signature.

LOUIS P. ARNOLD.